United States Patent
Storey

(10) Patent No.: US 10,984,359 B2
(45) Date of Patent: Apr. 20, 2021

(54) COMBINING BATCH AND QUEUEABLE TECHNOLOGIES IN A SALESFORCE PLATFORM FOR LARGE VOLUME PARALLEL PROCESSING

(71) Applicant: FinancialForce.com, Inc., San Francisco, CA (US)

(72) Inventor: Lee Francis Storey, Eggborough (GB)

(73) Assignee: FinancialForce.com, Inc., San Francisco, CA (US)

( * ) Notice: Subject to any disclaimer, the term of this patent is extended or adjusted under 35 U.S.C. 154(b) by 724 days.

(21) Appl. No.: 15/190,178

(22) Filed: Jun. 23, 2016

(65) Prior Publication Data
US 2017/0372246 A1 Dec. 28, 2017

(51) Int. Cl.
G06Q 10/06 (2012.01)
H04L 29/08 (2006.01)

(52) U.S. Cl.
CPC ....... *G06Q 10/06316* (2013.01); *H04L 67/10* (2013.01)

(58) Field of Classification Search
None
See application file for complete search history.

(56) References Cited

U.S. PATENT DOCUMENTS

| | | | | |
|---|---|---|---|---|
| 6,425,017 B1* | 7/2002 | Dievendorff | ............ | G06F 9/547 719/315 |
| 2009/0265531 A1* | 10/2009 | Hu | ...................... | G06F 11/3604 712/227 |
| 2011/0078297 A1* | 3/2011 | Tamura | ................. | G06F 9/5027 709/223 |
| 2011/0276945 A1* | 11/2011 | Chasman | .................. | G06F 8/71 717/124 |
| 2012/0198279 A1* | 8/2012 | Schroeder | ........... | G06F 11/2294 714/32 |
| 2012/0271857 A1* | 10/2012 | Chasman | .............. | G06F 16/273 707/791 |
| 2013/0139162 A1* | 5/2013 | Jackson | ................ | G06F 9/5011 718/100 |

(Continued)

OTHER PUBLICATIONS

Hive v Hbase, Different Technologies that work Better Together, dezyre webpages, Dec. 7, 2016 ttps://www.dezyre.com/article/hive-vs-hbase-different-technologies-that-work-better-together/322 (Year: 2016).*

(Continued)

*Primary Examiner* — Octavian Rotaru
(74) *Attorney, Agent, or Firm* — Kokka & Backus, PC

(57) ABSTRACT

Disclosed embodiments include a method for combining a BATCH application programming interface (API) and a QUEUEABLE API on a SALESFORCE platform to process records. The method can include accessing a programming environment associated with an add-on application for a SALESFORCE platform, obtaining records via the add-on application to be processed on the SALESFORCE platform in accordance with a job type, calling a BATCH API to process the records by batching the records to create job records, and calling a QUEUEABLE API to process the job records in QUEUEABLES including parallel QUEUEABLES such that at least some job records included in the parallel QUEUEABLES are processed in parallel in accordance with the job type.

6 Claims, 6 Drawing Sheets

(56) References Cited

U.S. PATENT DOCUMENTS

| | | | | |
|---|---|---|---|---|
| 2014/0053160 | A1* | 2/2014 | Fee | G06F 9/4843 |
| | | | | 718/101 |
| 2014/0344435 | A1* | 11/2014 | Mortimore, Jr. | H04L 41/5051 |
| | | | | 709/223 |
| 2015/0142846 | A1* | 5/2015 | Levine | G06F 16/258 |
| | | | | 707/769 |
| 2015/0143485 | A1* | 5/2015 | Tamura | G06F 21/121 |
| | | | | 726/6 |

OTHER PUBLICATIONS

What is batch processing in handopp, Quora webpages, May 29, 2016 https://www.quora.com/What-is-batch-processing-in-hadoop (Year: 2016).*

Hive v Hbase, Different Technologies that work Better Together, dezyre webpages, Dec. 7, 2016 https://www.dezyre.com/article/hive-vs-hbase-different-technologies-that-work-better-together/322 (Year: 2016).*

Map reduce, wikipedia, archives org, Jun. 16, 2016 https://web.archive.org/web/20160616175158/https://en.wikipedia.org/wiki/MapReduce (Year: 2016).*

* cited by examiner

COMBINING BATCH AND QUEUEABLE TECHNOLOGIES IN A SALESFORCE PLATFORM FOR LARGE VOLUME PARALLEL PROCESSING

TECHNICAL FIELD

The disclosed teachings relate to data processing. The disclosed teachings more particularly relate to a combining BATCH and QUEUEABLE technologies to allow for large volume parallel processing on a SALESFORCE platform.

BACKGROUND

Cloud platforms such as the SALESFORCE platform can allow for sharing processing resources and data in a multi-tenant network that offers computing services on demand to customers. More generally, cloud computing enables ubiquitous, on-demand access to a shared pool of configurable computing resources (e.g., networks, servers, storage, applications, and services), which can be rapidly provisioned and released with minimal management effort. Specifically, the SALESFORCE platform may provide numerous companies with an interface for case management and task management, and a system for automatically routing and escalating events.

The SALESFORCE platform can facilitate processing millions, hundreds of millions, or even billions of records while optimizing the performance of data loads and integration into a company's services. Parallel processing in the SALESFORCE platform can further facilitate processing large volumes of records. Generally, parallel processing is a mode of computing in which a process is split into parts that execute simultaneously on different functional units attached to common computing resources.

BATCH processing can involve the execution of a series of processing a batch of inputs in parallel rather than a single input. Further, processing BATCHES in parallel means running multiple BATCHES at the same time. Cloud platforms such as the SALESFORCE platform limit BATCH slots available to each tenant at the same time. Limiting the availability of BATCH slots helps balance loads among multiple tenants. However, these constraints limit throughput such that processing large volumes of records remain inadequate.

SUMMARY

Introduced here are at least one method and at least one apparatus. The at least one method is for combining a BATCH application programming interface (API) and a QUEUEABLE API on a SALESFORCE application development platform to process records. The method can include accessing a programming environment associated with an add-on application for a SALESFORCE application development platform, obtaining records via the add-on application to be processed on the SALESFORCE application development platform in accordance with a job type, calling a BATCH API to process the records by BATCHING the records to create job records, and calling a QUEUEABLE API to process the job records in QUEUEABLES including parallel QUEUEABLES such that at least some job records included in the parallel QUEUEABLES are processed in parallel in accordance with the job type.

In some embodiments, a method performed in accordance with a cloud-based computing architecture includes obtaining records to be processed in accordance with a job type, batching the records to create job records, and processing the job records in queueables including parallel queueables such that at least some records included in the parallel queueables are processed in parallel in accordance with the job type.

In some embodiments, an apparatus for combining a BATCH application programming interface, API, and a QUEUEABLE API on a SALESFORCE application development platform to process records includes a processor and a memory. The memory can include instructions which, when executed by the processor, cause the processor to access a programming environment associated with an add-on application for a SALESFORCE application development platform, obtain records via the add-on application to be processed on the SALESFORCE application development platform in accordance with a job type, call a BATCH API to process the records by BATCHING the records to create job records, and call a QUEUEABLE API to process the job records in QUEUEABLES including parallel QUEUEABLES such that at least some job records included in the parallel QUEUEABLES are processed in parallel in accordance with the job type.

Other aspects of the disclosed embodiments will be apparent from the accompanying figures and detailed description.

This Summary is provided to introduce a selection of concepts in a simplified form that are further explained in the Detailed Description. This Summary is not intended to identify key features or essential features of the claimed subject matter, nor is it intended to be used to limit the scope of the claimed subject matter.

DETAILED DESCRIPTION

Figure 1:
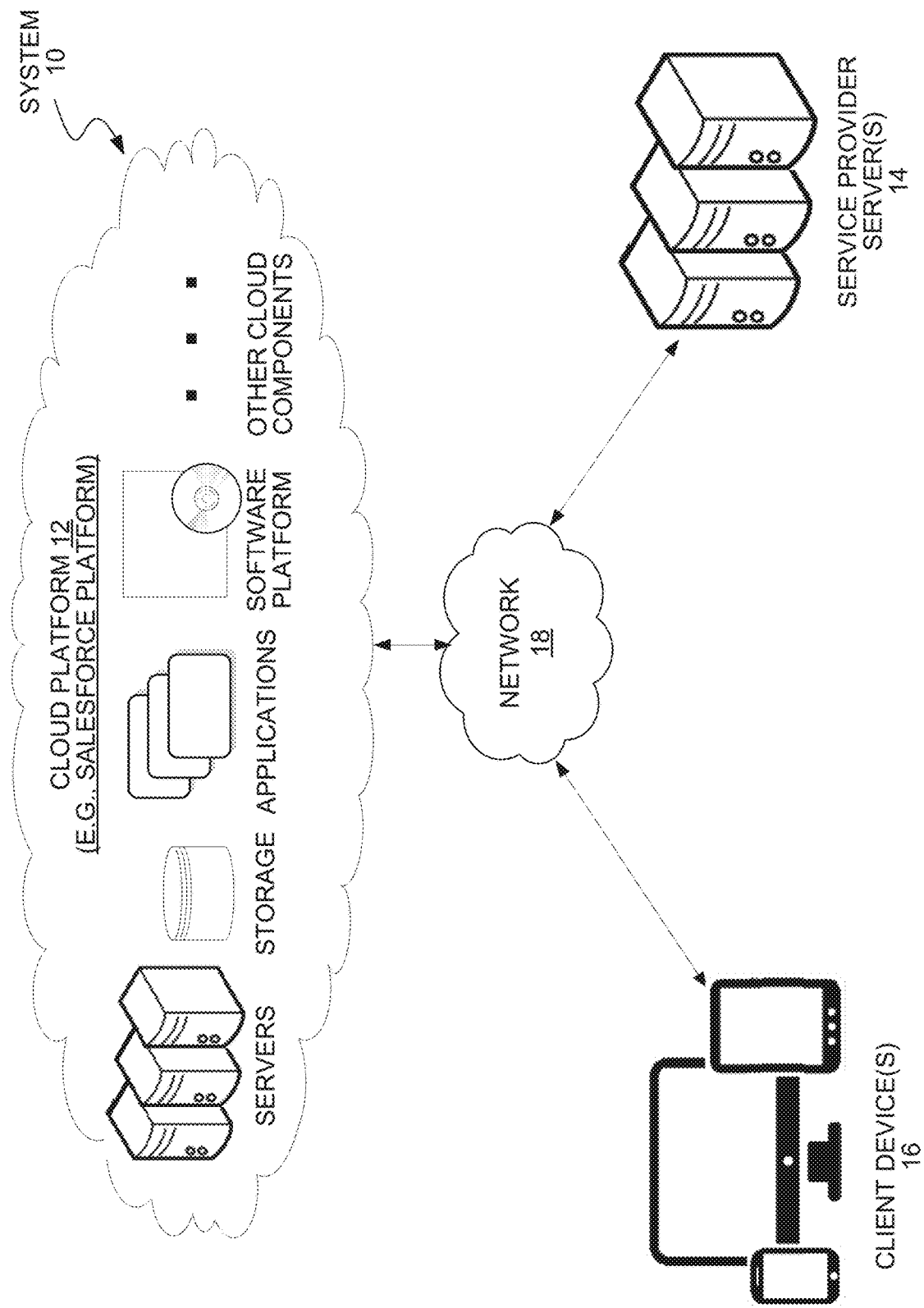
FIG. 1 is a block diagram of a system that implements a computing architecture that allows for large volume parallel processing according to some embodiments of the present disclosure.

The embodiments set forth below represent the necessary information to enable those skilled in the art to practice the embodiments, and illustrate the best mode of practicing the embodiments. Upon reading the following description in light of the accompanying figures, those skilled in the art will understand the concepts of the disclosure and will recognize applications of these concepts that are not particularly addressed here. It should be understood that these concepts and applications fall within the scope of the disclosure and the accompanying claims.

The purpose of terminology used herein is only for describing embodiments and is not intended to limit the scope of the disclosure. Where context permits, words using the singular or plural form may also include the plural or singular form, respectively.

As used herein, unless specifically stated otherwise, terms such as "processing," "computing," "calculating," "determining," "displaying," "generating," or the like, refer to actions and processes of a computer or similar electronic computing device that manipulates and transforms data represented as physical (electronic) quantities within the computer's memory or registers into other data similarly represented as physical quantities within the computer's memory, registers, or other such storage medium, transmission, or display devices.

As used herein, terms such as "connected," "coupled," or the like, refer to any connection or coupling, either direct or indirect, between two or more elements. The coupling or connection between the elements can be physical, logical, or a combination thereof.

Applications that require processing large volumes of data include business applications such as payroll, billing, customer relationship management, and the like. Processing large volumes of data requires a complex scalable computing infrastructure that is cost prohibitive to many businesses. As such, businesses turn to cloud computing to use a shared pool of configurable computing resources that provide scalable services for many of these applications. Cloud based applications are accessible through a portal (e.g., website) connected to a cloud infrastructure over a network.

The disclosed embodiments include at least one technique that allows for processing large volumes of data in parallel to improve throughput on the SALESFORCE platform. The disclosed technique combines BATCH and QUEUEABLE application program interfaces (APIs) of the SALESFORCE platform to provide parallel processing that avoids the limited throughput of solely processing in BATCH. Specifically, the SALESFORCE platform typically limits a number of BATCH slots available to processing. The disclosed technique bypasses these limits on BATCH processing to allow for processing large volumes of records and improve throughput as a result of parallel processing. As such, the SALESFORCE platform can be scaled to process large volumes of data.

The disclosed architecture is described in the context of subscription billing services in an effort to aid in understanding because such services typically require processing large volumes of records. However, the disclosed architecture has broad applicability to scale processing in the SALESFORCE platform or any similar cloud based services to process large volumes of data. Further, the disclosed architecture could process any amount of data to increase throughput.

FIG. 1 is a block diagram of a system 10 that implements the disclosed technique for large volume parallel processing according to some embodiments of the present disclosure. The system 10 includes components such as a cloud platform 12 (e.g., the SALESFORCE platform), one or more service provider servers 14 that use cloud based services to provide add-on applications, and one or more client devices 16 that use the add-on applications, all of which are interconnected over a network 18, such as the Internet, to provide parallel processing of a large volume of data.

The network 18 may include any combination of private, public, wired, or wireless portions. Data communicated over the network 18 may be encrypted or unencrypted at various locations or along different portions of the network 18. Each component of the system 10 may include combinations of hardware and/or software to process data, perform functions, communicate over the network 18, and the like. For example, any component of the system 10 may include a processor, memory or storage, a network transceiver, a display, an operating system, and application software (e.g., for providing a user portal), and the like. Other components, hardware, and/or software included in the system 10 are well known to persons skilled in the art and, as such, are not shown or discussed herein.

The cloud platform 12 can provide access to a shared pool of configurable computing resources including servers, storage, applications, software platform, networks, services, and the like accessed by the service provider servers 14 to offer add-on applications to client devices 16. The SALESFORCE platform (e.g., the cloud service provider 12) supports multiple tenants and is commonly referred to as a platform as a service (PaaS).

The PaaS is provided to developers for creating the add-on applications that run on the components of the cloud service provider 12. FORCE.COM is an example of a PaaS that hosts applications hosted on SALESFORCE.COM, which is an example of a cloud platform. For example, add-on applications can provide subscription billing services to users using the client devices 16. The subscription billing services are provided by the service provider servers 14 and include applications built on the software platform of the cloud platform 12.

The service provider servers 14 may include any number of server computers that provide the add-on applications such as subscription billing services, which allow businesses to automatically bill their customers for goods or services on a pre-arranged schedule. The billing services may support installment payments, usage-based billing, multiple charging methods (e.g., tiered or capped). Although shown separately from the cloud platform 12, the service provider servers 14 may be included as part of the cloud platform 12.

The service provider servers 14 may provide or administer a user interface (e.g., website) accessible from the client devices 16. The user interface may include features such as dashboard analytics to provide insight into how a business is performing. Examples of businesses that could benefit from subscription billing services range from SaaS (Software as a Service) providers to energy and utilities companies.

The add-on applications provided by the service provider servers 14 are built using a particular programming language. For example, FORCE.COM applications are built using APEX (a proprietary Java-like programming language for FORCE.COM) and VISUALFORCE (an XML syntax typically used to generate HTML). The code used to build applications may include functions that are accessible by the add-on applications.

The add-on applications process large volumes of data generated by businesses. For example, the service provider servers 14 can provide subscription billing services that process large volumes of billing data generated by businesses that have a large number of customers that are billed routinely for ongoing services. The data may include sales agreements, usage, and pricing, which are used to generate sales invoices to bill customers. As such, voluminous amounts of data are generated continuously.

Figure 2:
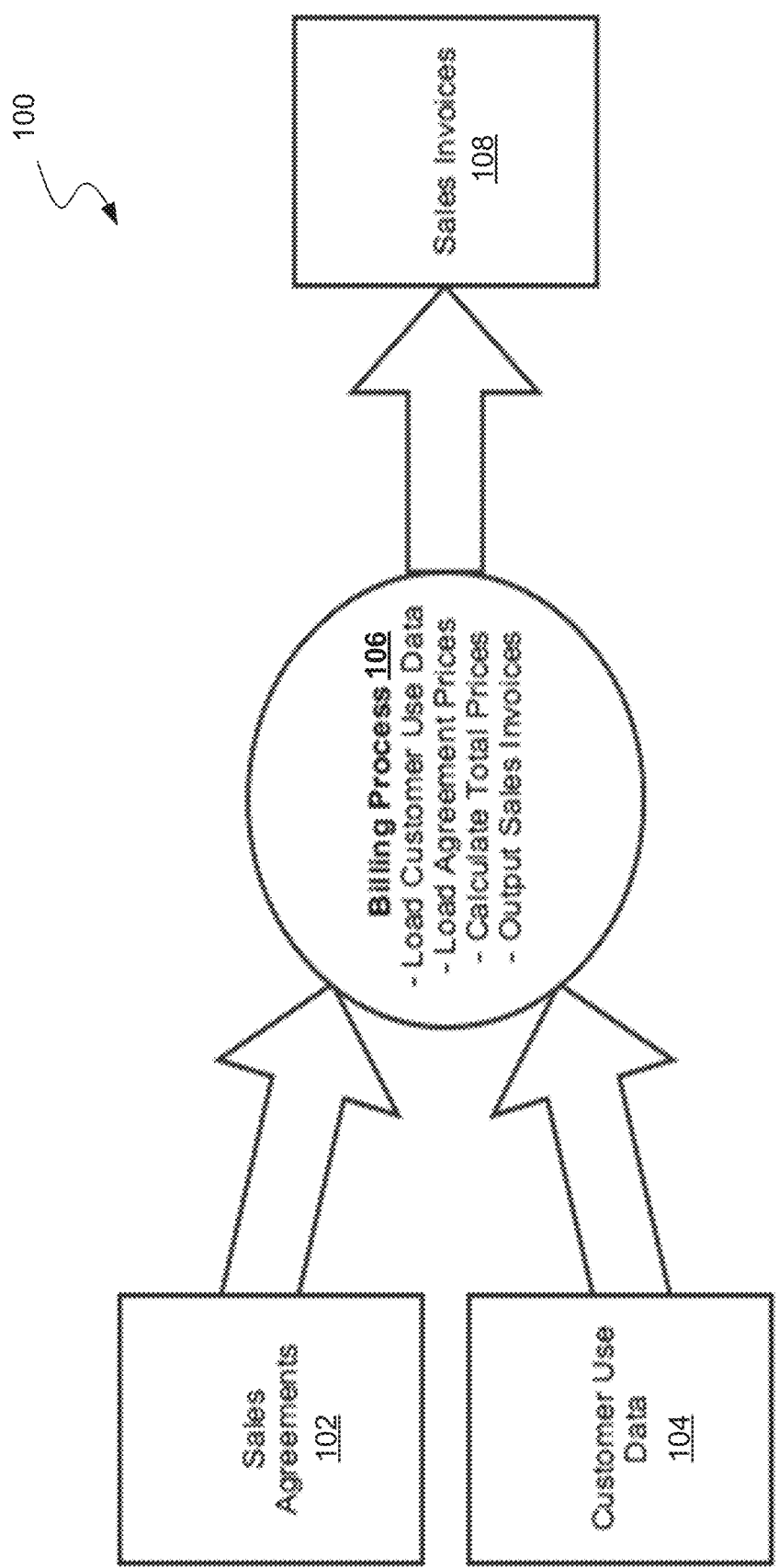
FIG. 2 is a diagram illustrating a process of a subscription billing service according to some embodiments of the present disclosure.

FIG. 2 is a diagram illustrating a process 100 of subscription billing services provided by the service provider servers 14 according to some embodiments of the present disclosure. As shown, sales agreements 102 and customer use data 104 are inputs to a billing process 106. The billing process 106 loads the customer use data as well as agreement prices. The billing process 106 then calculates total prices to output sales invoices. Lastly, the sales invoices 108 are output as records, including data lines that reflect the billing.

Referring back to FIG. 1, the client devices 16 (referred to herein collectively as client devices 16 and individually as client device 16) are used by users (e.g., businesses using the subscription billing services) to interact with the system 10. Examples of client devices include computers (e.g., APPLE MACBOOK, LENOVO 440), tablet computers (e.g., APPLE IPAD, SAMSUNG NOTE, AMAZON FIRE, MICROSOFT SURFACE), smartphones (e.g., APPLE IPHONE, SAMSUNG GALAXY, NOKIA LUMINA), and any other device that is capable of accessing the service provider servers 14 over the network 18.

In an effort to accommodate multiple tenants (e.g., multiple service providers), the cloud platform 12 may restrict the number of concurrent processes available to users. For example, the SALESFORCE platform limits users to a few concurrent processes at any time, which not only limits throughput to process large volumes of data, but can also interfere with other processes concurrently running in the background.

The BATCH API is an example of an asynchronous process provided by the SALESFORCE platform to process large volumes of data in batches. A developer can employ BATCH to build complex, long-running processes that operate on thousands of records. A BATCH can operate over an entire record broken down into manageable chunks of data. For example, a developer could build an archiving service that runs nightly to process older records and add older data to an archive. A developer could also build an updating service that updates account information nightly based on criteria.

The BATCH API can be programmatically invoked at runtime using code of the SALESFORCE platform. However, the code limits the number of BATCHES that are possible at any one time. As such, BATCH allows the service provider services 14 to process large volumes of data, but subjects the processing to constraints that limit throughput. More specifically, the BATCH API of the SALESFORCE platform is an interface limited to five queued or active BATCHES at one time. As such, users are constrained by a current count of BATCHES before initiating any new ones.

A BATCH can be programmatically scheduled to run at specific times using a scheduler. A BATCH can also be invoked from a TRIGGER API. A TRIGGER is code that executes before or after some types of operations. For example, a TRIGGER can enable a BATCH to occur before or after changes are made to records, such as insertions, updates, or deletions. Since the number of concurrent BATCHES is limited, invoking BATCH from a TRIGGER could inadvertently add more BATCHES than what is permitted.

Existing subscription billing services may implement BATCH to process large volumes of records. For example, a target volume for processing may be a million lines of data per hour. This target could be processed using BATCH, which provide limited parallel processing of data lines. For example, a single BATCH may process 150,000 to 200,000 data lines per hour. Consequently, processing a million data lines would require at least five hours, but more likely take eight to nine hours to process due to other concurrent processes. As such, the BATCH API of the salesforce platform has limited throughput.

Even if multiple BATCHES were run concurrently, using all available BATCH slots may interfere with background processes such that processing the target volume in an hour is not possible. In other words, the target volume may be achieved in less time when using multiple concurrent BATCH slots, but using all available BATCH slots may interfere with other processes such that BATCH processes are forced to wait.

Using concurrent BATCH slots cannot accommodate processing an ongoing production of records of varying volumes at a target rate. For example, 10,000 records (each with 10 to 100,000 data lines) could be generated monthly, and 50,000 records (each with 10 to 500,000 data lines) could be generated at peak times. The ongoing production of large volumes of data requires a sufficient rate of processing to keep pace with the production. For example, an adequate average processing time may be 1 to 10 minutes, and an adequate peak processing time may be 10 to 30 minutes. As such, existing methods do not provide acceptable throughput, which is critical for maintaining operations when voluminous amounts of data is generated continuously. The disclosed architecture overcomes these drawbacks.

The disclosed embodiments include a technique that combines BATCH and QUEUEABLE technologies of the SALESFORCE platform for parallel processing to improve throughput of large volumes of records including multiple lines of data. A QUEUEABLE is an example of a queueing technology included in the SALESFORCE platform. A QUEUEABLE is an asynchronous process that can be queued for execution. After a job is submitted for execution, the job is added to the queue and will be processed when system resources become available.

A QUEUEABLE can be associated with an identifier that allows for monitoring a designated job. As such, a QUEUEABLE interface can enable access to queueables. For example, the interface can enable developers to add jobs to a queue and monitor the status of the associated QUEUEABLES. The status of a QUEUEABLE can be monitored programmatically by querying the QUEUEABLE or through the user interface. Processes that run for a long time can be run asynchronously by implementing the QUEUEABLE interface and adding a job to a job queue. As such, an asynchronous QUEUEABLE can run in the background in its own thread and does not delay the execution of other logic. A benefit of using the QUEUEABLE interface is that some governor limits may be greater compared for synchronous processes.

In some embodiments, QUEUEABLES can be chained. Specifically, a QUEUEABLE can be chained to another by starting another QUEUEABLE from a running QUEUEABLE. Typically, only one QUEUEABLE can exist for each parent QUEUEABLE at any time. However, there may be no limit on the depth of chained QUEUEABLES. As such, a QUEUEABLE can be chained to another QUEUEABLE, and this process can repeat with each child QUEUEABLE linked to a new child.

Figure 3:
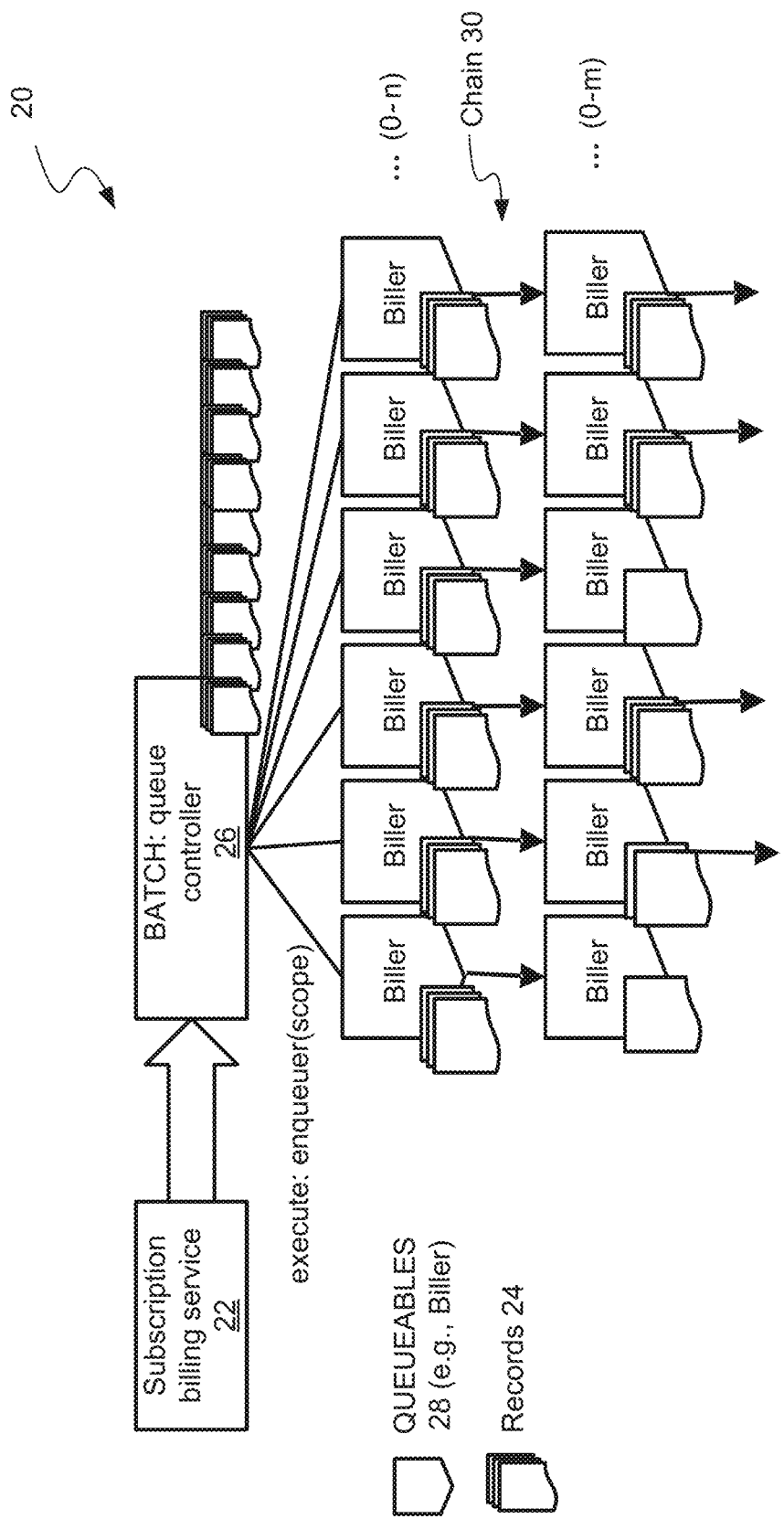
FIG. 3 is a block diagram illustrating the computing architecture that combines BATCH and QUEUEABLE technologies to process a relatively large volume of records and improve throughput according to some embodiments of the present disclosure.

FIG. 3 is a block diagram illustrating a BATCH and QUEUEABLE combined computing architecture 20 according to some embodiments of the present disclosure. The computing architecture 20 is part of a subscription billing service 22 provided to client devices 16 by service provider servers 14 using the cloud service provider 12 (e.g., the SALESFORCE platform) over the network 18. The computing architecture 20 is operable to process a large volume of records 24 (referred to collectively as records 24 and individually as record 24). A "record" refers to container that includes data to be processed in a job. For example, a document that includes lines of data can be a record 24. Each record 24 can be received or processed asynchronously.

The subscription billing service 22 provides records 24 to a BATCH queue controller 26 (hereinafter BATCH 26). The BATCH 26 groups the records 24 into BATCHES that are processed by QUEUEABLES 28 (referred to collectively as QUEUEABLES or billers 28 and individually as a QUEUEABLE or biller 28). The BATCH 26 can execute an enqueuer function to allocate a scope size of each QUEUEABLE 28.

A scope size refers to a number of records for each QUEUEABLE, BATCH, or any other asynchronous process. The scope size of the BATCH 26 that generates QUEUEABLES may be less significant to throughput compared to the scope size of the QUEUEABLES 28, which provide parallel processing of the records 24. In some embodiments, the scope size of the QUEUEABLES 28 may be predetermined or dynamically determined. For example, the computing architecture 20 can dynamically adjust the scope size by designating records 24 to be processed from a list of records 24. The scope size can be configured for the BATCH 26 in the same way as the scope size is configured for the QUEUEABLES 28. In some embodiments, a scope size can be optimized based on job types (e.g., billing service).

The computing architecture 20 may include a number of QUEUEABLES 28 concurrently processing a number of records 24. The QUEUEABLES 28 may be arranged in a chain 30 that includes n parent QUEUEABLES 28 and m child QUEUEABLES in the chain 30. The number of concurrent QUEUEABLES 28 as well as the arrangement of chain 30 can be predetermined or dynamically determined.

Increasing a number of concurrent QUEUEABLES 28 can further improve parallel processing and throughput. For example, using 50 or more concurrent QUEUEABLES 28 could provide sufficient throughput to achieve the target volume of a million data lines per hour. Further, using 100 QUEUEABLES 28 may be optimal because this would reduce the chance that jobs finish without having anything more to do and avoids any delay caused by the re-queue logic needing to require any jobs. On the other hand, using a decreased amount of concurrent QUEUEABLE would provide a higher priority to other processes that are concurrently running. Moreover, using a relatively small number of records per run would allow a fast finish and re-queue.

In practice, the computing architecture 20 provides an interface, and a user simply submits a request to process records asynchronously. The interface calls a service of the computing architecture 20 to process the records 24 as a job. The service returns a list of identifiers, which starts a BATCH that iterates over the identifiers. Note that all records associated with the identifiers may not yet be available because records are received and processed asynchronously. The identifiers process the records, and can also be used to track and monitor the job and associated data (e.g., the records).

Figure 4:
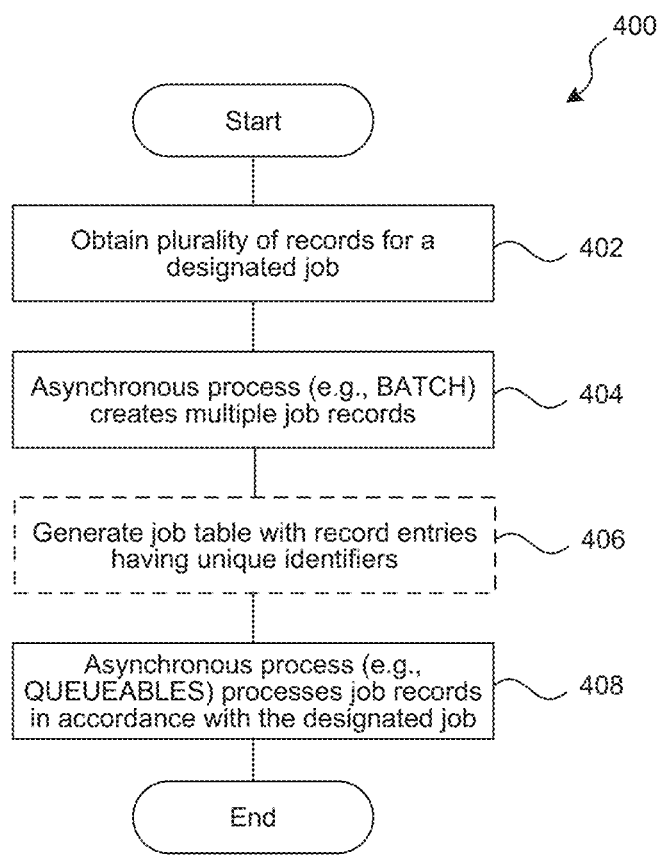
FIG. 4 is a flowchart illustrating a process performed by the SALESFORCE platform that combines BATCH and QUEUEABLE processes to process a relatively large volume of records and improve throughput according to some embodiments of the present disclosure.

FIG. 4 is a flowchart illustrating a process 400 performed on the SALESFORCE platform that combines BATCH and QUEUEABLE processes to process a relatively large volume of records and improve throughput according to some embodiments of the present disclosure. In step 402, the SALESFORCE platform obtains multiple records to perform a designated job. For example, the subscription billing service 22 can provide a relatively large volume of records 24 to the computing architecture 20. The records 24 may be provided to perform the job of producing sales invoices.

The SALESFORCE platform initiates asynchronous processes (e.g., BATCH or QUEUEABLES) to process the multiple job records in accordance with the job. In particular, in step 404, a first asynchronous process creates multiple job records from the multiple records obtained by the computing architecture. For example, a BATCH 26 can create the multiple job records from the relatively large volume of records 24 provided by the subscription billing service 22.

In some embodiments, a job table can be created to process a bulk of records that have been obtained (e.g., received via the subscription billing service 22). For example, in optional step 406, the BATCH generates a job table that is populated with a record entry for each job record. Each record entry can include various parameter values such as a unique record identifier for the record. In some embodiments, the unique record identifier is a unique string value relative to other string values used to identify records referred to in the job table. For example, a job table could have 50,000 distinct entries for 50,000 records, and each entry could have a unique identifier (e.g., agreement identifier in the context of subscription billing).

In some embodiments, a record entry can include various parameter values in addition to (or instead of) a unique record identifier. For example, a record entry may include a call identifier representing the call that initiated the asynchronous processing. All job records with the same call identifier were initiated with the same call. A record entry may also include a QUEUEABLE identifier that identifies the QUEUEABLE that is given the job record to process, time information (e.g., timestamp) that indicates, for example, the last time a job record was modified, and a job type identifier used to determine how the job record will be processed. In other words, a job record is processed in accordance with the job type, which is referenced by a job type identifier. Examples of a job type include "post," "revaluate," "bill," or the like.

In some embodiments, a record entry may include status information (e.g., complete, error, retry) that indicates a processing status of the job record. The status information could be used to determine how to handle the job record. For example, a job checker process can include logic that uses the status information to retry unsuccessful processing run of the corresponding job record. Examples of the job checker process are detailed further below.

The first asynchronous process (e.g., BATCH) executes other asynchronous processes to process the job records in accordance with the designated job (per a job type). For example, in step 408, a second asynchronous process (e.g., QUEUEABLES) is initiated to process the job records in accordance with the designated job (per a job type). For example, the BATCH can execute an enqueuer to queue the batch of job records into QUEUEABLES having respective scope sizes. In one specific implementation, the computing architecture may process 50,000 records (each including 10 data lines) including a total of 500,000 data lines. Using 100 queueables would require processing 500 records per QUEUEABLE, and each QUEUEABLE would require processing 5,000 data lines.

The second asynchronous process may be a QUEUEABLE by default, a BATCH, or a scheduled job. For example, the second asynchronous process may be a BATCH instead of QUEUEABLE. As such, an initial BATCH with the same inputs can generate a job table, and another BATCH can operate on the records from the job table per execute similar to QUEUEABLES.

If the second asynchronous process includes QUEUEABLES, the QUEUEABLES can be arranged in a chain such that some QUEUEABLES start processing job records in response to other QUEUEABLES completing the processing of their job records. Moreover, some of the QUEUEABLES may be processed concurrently to provide parallel processing of job records. Each QUEUEABLE may include one or more unique identifiers (e.g., unique record identifiers) used to identify job records from the job table. Execution of each QUEUEABLE (e.g., a QUEUEABLE per execute) causes processing of the job records identified by their unique identifiers.

In general, the running second asynchronous process can read job records and pass their unique identifiers and associated job type identifier to a job handler, which processes the records in accordance with the job type to perform work (e.g., billing). The status information of each job record is updated accordingly. For example, the status information can be updated to "complete" after successfully completing a process for a job record, updated to "error" if an exception is encountered, or remain "pending" if the run of a job record ends without encountering an exception. If a QUEUEABLE is chained to another QUEUEABLE, the identifier of the child QUEUEABLE can be written in the record entry associated with any job records that remain pending.

Note that the process detailed above introduces an initial delay because it uses an initial BATCH to create the job records rather than simply starting QUEUEABLES. Nevertheless, the initial BATCH can create almost two million job records per hour. As such, gains obtained from parallel processing by using QUEUEABLES compensate for the delay caused by the initial BATCH. As such, the combination of BATCH and QUEUEABLES can process the target volume of a million data lines in about 11 minutes, with a potential for processing four to six million data lines per hour. Thus, the combination of BATCH and QUEUEABLE technologies provides improved throughput and finer control to tune the processing of the records compared to solely using a limited number of BATCH slots.

Figure 5:
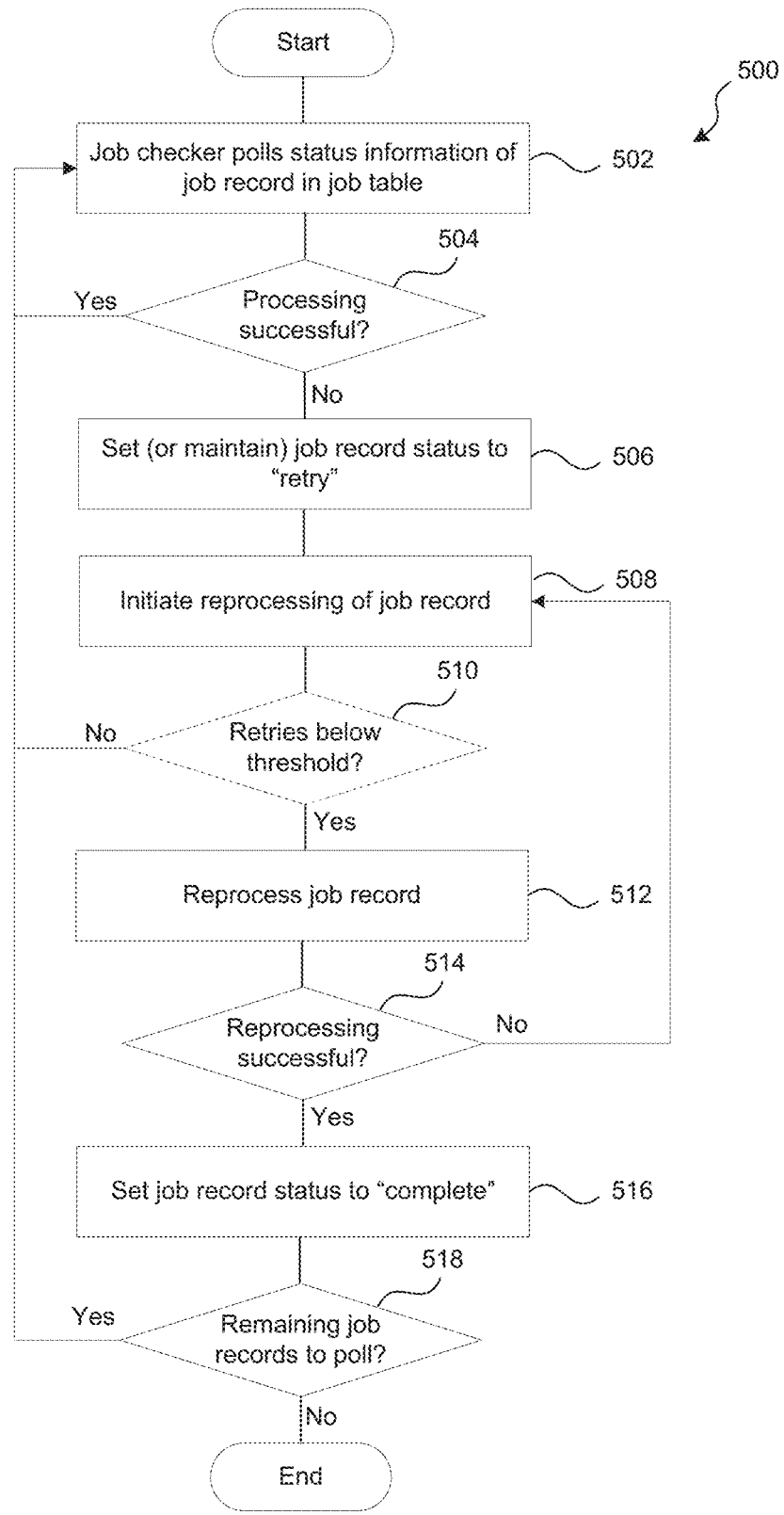
FIG. 5 is a flowchart illustrating a process for reprocessing job records that were previously unsuccessfully processed according to some embodiments of the present disclosure.

FIG. 5 is a flowchart illustrating a process 500 for reprocessing job records that were previously unsuccessfully processed according to some embodiments of the present disclosure. In step 502, a job checker polls status information of job records in the job table. The status information may include a "pending," "completed," "error," or "retry" status. The process for reprocessing job records is not limited to that shown in FIG. 5. In particular, FIG. 5 shows a process for polling the status information iteratively, but the polling process could be reduced by performing BATCH polling.

In step 504, the job checker determines whether a job record has been successfully processed (e.g., has a "completed" status). If so, the job checker iteratively polls the status of another job record in the job table. In step 506, if the job record has not been successfully processed (e.g., has an "error" status), the status of the job record is set to "retry." In one example, a job record having a status of "pending" but whose asynchronous processes finished had experienced an error (e.g., exception terminated QUEUEABLE chain) and will otherwise never be processed.

In step 508, the job checker initiates reprocessing of the job record having the "retry" status. In step 510, the job checker optionally determines a number of previous processing attempts ("retries") performed on the job record. In step 512, if the number of retries for the job record is below a threshold amount (e.g., three retries), then the job record can be reprocessed in accordance with the designated job type. If not, the job checker continues to iteratively poll the status information of another job record in the job table.

In steps 514, the job checker determines whether the job record has been successfully processed. In step 516, if the job record has been successfully reprocessed, the status of the job record is set to "complete." If not, the job checker initiates returns to step 508 to initiate the reprocessing of the job record. In step 518, the job checker continues to iteratively poll the status information of remaining job records until there are no more job records to poll in the job table. In some embodiments, the job checker will continue polling the status information of the job records having a "retry" status until a sufficient amount of job records have been processed.

In some embodiments, the job checker can be scheduled to monitor the status information of the job records periodically (e.g., every minute) until all records have a "completed" status or a predetermined number of retries for records have been performed. Hence, the designated job is complete when all the job records have been completed or all available retries have been exhausted. As such, the computing architecture can recover from events such as a chain collapse, which is not an issue with BATCH (e.g., executes fail but the BATCH continues).

In some embodiments, the computing architecture can include a mechanism the provides notifications about the status of the designated job including status information about each job record. This is again a solution for issue that tends to arise with QUEUEABLES because each execute of a QUEUEABLE is independent of others.

In some embodiments, the computing architecture includes a process to delete job records from the job table periodically and/or in accordance with a schedule. For example, a job record entry could be deleted based on its associated timestamp. In some embodiments, the job records could be viewed for debugging before eventually being deleted.

In some embodiments, multiple BATCHES could initiate the asynchronous processing. For example, a first BATCH could generate job records and a second BATCH could start job record processing. This use of multiple BATCHES for different stages of the initial processing can help mitigate errors (however, if job generation fails, then the entire asynchronous processing is lost).

In some embodiments, the second BATCH that starts job record processing can provide a call used to conduct a retry that is distinct from a call for job generation. However, the use of a second BATCH introduces yet another delay, one that can be harder to quantify. In some embodiments, various APIs can be used to mitigate the risk of the second BATCH starting before the first BATCH (which generates the job records) ends.

The computing architecture is subjected to governor limits. In particular, because, for example, the SALESFORCE platform runs in a multitenant environment, the runtime engine may strictly enforce limits to ensure that runaway code or processes do not monopolize shared resources. If a code ever exceeds a limit, the associated governor can issue a runtime exception that cannot be handled. However, BATCH alone is subject to governor limits, and the disclosed computing architecture barely affects those limits. Further, each QUEUEABLE has a fairly limited chunk of job records to maximize parallel processing and avoid governor limits. As such, the computing platform is not burdened more by the effects of governor limits compared to existing systems.

In some embodiments, parameters can be passed during asynchronous processing. For example, the unique record identifiers can be passed as described above. In addition, other parameters, such as dates of processing, could also be passed during processing. In some embodiments, the parameters passed during processing could be determined by a user in a manner similar to how a caller schedules jobs. The calls could obtain the record identifiers and store any related parameters as custom objects to load when a job is called. In some embodiments, the parameters can be kept in their states and passed through to the BATCH or QUEUEABLE to pass to a job handler.

In some embodiments, the architecture may run stateful processes. This may not be possible nor logical in parallel processing and, as such, state information is not shared across processes running in parallel in the disclosed embodiments. However, a job handler of a job running in serial BATCH mode would be a stateful as a member of the BATCH. As such, if a need to run a single stateful process arose, a mechanism of the computing architecture could disable parallel processing and instead run in BATCH mode with a single instance of the job handler and then designate when the instances finish.

In some embodiments, state information about errors and notifications can be passed to users (e.g., administrators) for troubleshooting. In some embodiments, the computing architecture may include a mechanism for merging an entire designated job into a single event message indicating that everything has finished (i.e., the computing architecture would handle all the errors). In some embodiments, a logging and notification system could be used instead of passing state information. In some embodiments, the logging and notification system is separate from the computing architecture to avoid burdening the computing architecture with additional processes.

Figure 6:
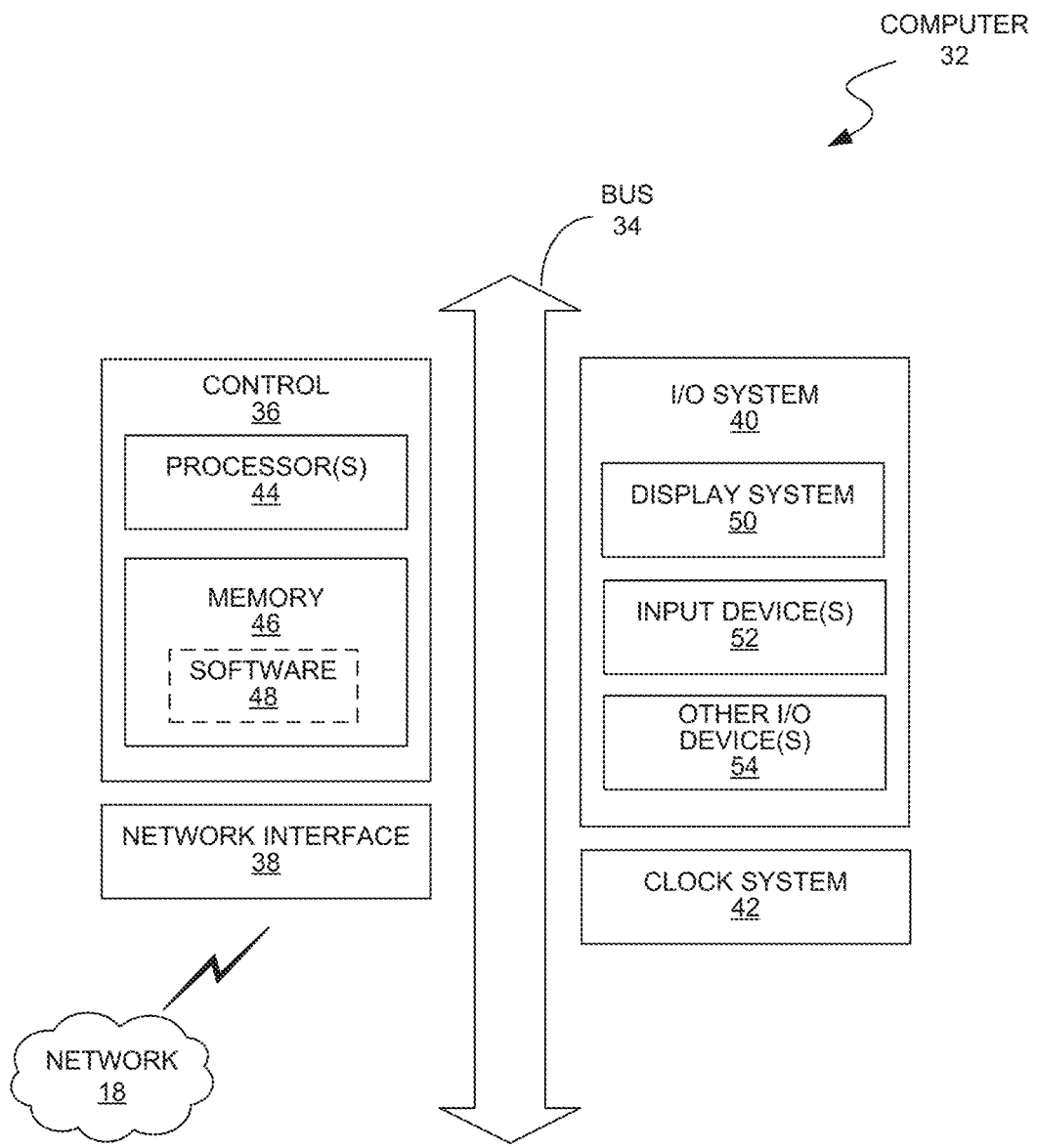
FIG. 6 is a block diagram illustrating a computer operable to implement the disclosed technology according to some embodiments of the present disclosure.

FIG. 6 is a block diagram illustrating a computing device operable to implement the disclosed technology according to some embodiments of the present disclosure. As shown, a computer 32 includes a bus 34 that is operable to transfer data between hardware components. These components include a control 36 (e.g., processing system), a network interface 38, an input/output (I/O) system 40, and a clock system 42. The computing device 32 may include other components that are not shown nor further discussed for the sake of brevity. One having ordinary skill in the art will understand any hardware and software that is included but not shown in FIG. 6.

The control 36 includes one or more processors 44 (e.g., central processing units (CPUs), application specific integrated circuits (ASICs), and/or field programmable gate arrays (FPGAs), and memory 46 (which may include software 48). For example, the memory 46 may include volatile memory, such as random-access memory (RAM) and/or non-volatile memory, such as read-only memory (ROM). The memory 46 can be local, remote, or distributed.

A software program (e.g., software 48), when referred to as "implemented in a computer-readable storage medium," includes computer-readable instructions stored in the memory (e.g., memory 46). A processor (e.g., processor 44) is "configured to execute a software program" when at least one value associated with the software program is stored in a register that is readable by the processor. In some embodiments, routines executed to implement the disclosed embodiments may be implemented as part of operating system (OS) software (e.g., Microsoft Windows® and Linux®) or a specific software application, component, program, object, module, or sequence of instructions referred to as "computer programs."

As such, the computer programs typically comprise one or more instructions set at various times in various memory devices of a computer (e.g., computing device 32), which, when read and executed by at least one processor (e.g., processor 44), will cause the computer to perform operations to execute features involving the various aspects of the disclosed embodiments. In some embodiments, a carrier containing the aforementioned computer program product is provided. The carrier is one of an electronic signal, an optical signal, a radio signal, or a non-transitory computer-readable storage medium (e.g., memory 46).

Network interface 38 may include a modem or other interfaces (not shown) for coupling the computing device 32 to other computers over the network 18. The I/O system 40 may operate to control various I/O devices, including peripheral devices such as a display system 50 (e.g., a monitor or touch-sensitive display) and one or more input devices 52 (e.g., a keyboard and/or pointing device). Other I/O devices 54 may include, for example, a disk drive, printer, scanner, or the like. Lastly, the clock system 42 controls a timer for use by the disclosed embodiments.

Operation of a memory device (e.g., memory 46), such as a change in state from a binary one (1) to a binary zero (0) (or vice versa) may comprise a visually perceptible physical change or transformation. The transformation may comprise a physical transformation of an article to a different state or thing. For example, a change in state may involve accumulation and storage of charge or a release of stored charge. Likewise, a change of state may comprise a physical change or transformation in magnetic orientation or a physical change or transformation in molecular structure, such as a change from crystalline to amorphous or vice versa.

Aspects of the disclosed embodiments may be described in terms of algorithms and symbolic representations of operations on data bits stored in memory. These algorithmic descriptions and symbolic representations generally include a sequence of operations leading to a desired result. The operations require physical manipulations of physical quantities. Usually, though not necessarily, these quantities take the form of electric or magnetic signals that are capable of being stored, transferred, combined, compared, and otherwise manipulated. Customarily, and for convenience, these signals are referred to as bits, values, elements, symbols, characters, terms, numbers, or the like. These and similar terms are associated with physical quantities and are merely convenient labels applied to these quantities.

While embodiments have been described in the context of fully functioning computers, those skilled in the art will appreciate that the various embodiments are capable of being distributed as a program product in a variety of forms and that the disclosure applies equally, regardless of the particular type of machine or computer-readable media used to actually effect the embodiments.

While the disclosure has been described in terms of several embodiments, those skilled in the art will recognize that the disclosure is not limited to the embodiments described herein and can be practiced with modifications and alterations within the spirit and scope of the invention. Those skilled in the art will also recognize improvements to the embodiments of the present disclosure. All such improvements are considered within the scope of the concepts disclosed herein. Thus, the description is to be regarded as illustrative instead of limiting.

The invention claimed is:

1. A method for achieving improved throughput and finer control in processing a plurality of records by asynchronously combining batching and a plurality of queueables performed in accordance with a cloud-based computing architecture, the method comprising:

accessing a programming environment associated with an application for an application development platform of the cloud-based computing architecture;

obtaining the plurality of records via the application to be processed on the application development platform in accordance with a job type;

executing a first asynchronous process by calling a batching application programing interface (API) on the application development platform for limited asynchronous batching of the plurality of records to create a plurality of job records by generating a job table to process the plurality of records, the job table being populated with a record entry and unique identifier for each of the plurality of records;

calling a queueing application programing interface (API) to asynchronously process the plurality of job records from the job table in the plurality of queueables by determining a scope size for each of the plurality of queueables, the scope size including a number of the plurality of job records, and allocating the job records to the plurality of queueables in accordance with the scope size for each of the plurality of queueables, wherein the plurality of queueables includes a plurality of parallel queueables such that at least some job records included in the plurality of parallel queueables are processed in parallel in accordance with the job type; and increasing a number of the plurality of queueables and executing a second asynchronous process by chaining at least one of the plurality of queueables to another queueable, the at least one queueable being initiated to run in parallel processing while the another queueable is running, wherein an identifier associated with the at least one queueable indicates a last time a job record was modified and is written in one or more of the plurality of job records, and wherein another identifier associated with the another queuable determines how the job record will be processed and is written to another one or more of the plurality of job records.

2. The method of claim 1, wherein the plurality of queueables are arranged in a chain such that a first plurality of the plurality of queueables start processing the one or more job records in response to a second plurality of the plurality of queueables completing processing of the other one or more job records.

3. The method of claim 2, wherein the first plurality of the plurality of queueables comprises the plurality of parallel queueables and the second plurality comprises another plurality of parallel queueables such that at least some records included in the second plurality of the plurality of queueables are processed in parallel.

4. The method of claim 1, wherein the unique identifier is a record identifier that uniquely identifies the job record from other job records referred to in the job table.

5. The method of claim 4, wherein each record entry comprises values for parameters including any of:

a call identifier representing a call that initiated the batch;

a queueable identifier indicating a queueable of the plurality of queueables that was given the job record to process;

time information indicating the last time the job record was modified;

a job type identifier indicating how the job record should be processed; and status information indicating a processing status of the job record.

6. The method of claim 1, wherein each record entry comprises status information including a status of a job record, the method further comprising:

polling the job table for the status in a record entry of each job record;

initiating reprocessing of the job record in accordance with the status of the job record; and reprocessing any job record in accordance with the job type.

* * * * *